United States Patent [19]

Hasumoto et al.

[11] Patent Number: 4,874,403
[45] Date of Patent: Oct. 17, 1989

[54] PROCESS FOR TREATING WASTE GASES CONTAINING TRICHLOROTRIFLUOROETHANE AND APPARATUS THEREFOR

[75] Inventors: Toshiharu Hasumoto; Kunio Kashiwada; Minoru Konishi; Nobuo Fujishiro, all of Kawasaki, Japan

[73] Assignee: Showa Denko Kabushiki Kaisha, Tokyo, Japan

[21] Appl. No.: 232,497

[22] Filed: Aug. 15, 1988

[30] Foreign Application Priority Data

Dec. 25, 1987 [JP] Japan ................................ 62-328958

[51] Int. Cl.$^4$ ............................................. B01D 19/00
[52] U.S. Cl. .......................................... 55/55; 55/71; 55/40
[58] Field of Search ................................ 55/55, 40, 71

[56] References Cited

U.S. PATENT DOCUMENTS 2,540,905  2/1951  Neuberger et al. ...................... 55/71
3,581,466  6/1971  Rudolph et al. ........................ 55/71

FOREIGN PATENT DOCUMENTS 1179106  9/1966  United Kingdom .................... 55/71

*Primary Examiner*—Bernard Nozick
*Attorney, Agent, or Firm*—Frishauf, Holtz, Goodman & Woodward

[57] ABSTRACT

A method of treating a trichlorotrifluoroethane containing waste gas. The trichlorotrifluoroethane waste gas is contacted at atmospheric pressure or under pressurized conditions with at least one absorber selected from the group consisting of saturated mineral oils, alkyl dipheny ether based oils, silicone oils, trichlorotrifluoroethane based oils, and perfluoropolyether based oils, having a vapor pressure of not higher than $7.6 \times 10_2$ mmHg at 25° C. and a viscosity of not higher than 500 cp at 25° C., to remove trichlorotrifluoroethane contained in the waste gas by absorbing, and depressurizing the absorber having absorbed therein trichlorotrifluoroethane to recover trichlorotrifluoroethane.

1 Claim, 3 Drawing Sheets

PROCESS FOR TREATING WASTE GASES CONTAINING TRICHLOROTRIFLUOROETHANE AND APPARATUS THEREFOR

BACKGROUND OF THE INVENTION

1. Field of the Invention

This invention relates to a method of treating flon-113 containing-waste gas which enables recovery and removal of flon-113 that is used widely and in large amounts among various flons from flon-113 containing-waste gas to prevent it from being released as it is in the air and also to an apparatus therefor.

2. Prior Art

Flons are generally low in toxicity, and are used in various fields such as electronics as a detergent, a solvent, etc.

However, there have occurred increase in the number of patients with dermal cancer, and destruction of ozone layer by flon gas which is said to be a cause of environmental abnormality and as a result it went so far that it has been decided in an international conference that consumption of flons should be reduced. Flons whose consumption is to be reduced include flon-11 ($CCl_3F$), flon-12 ($CCl_2F_2$), flon-113 ($C_2Cl_3F_3$), flon-114 ($C_2Cl_2F_4$), and flon-115 ($C_2ClF_5$). Particularly, flon-113 is used in large amounts. Reportedly, the amount of flon-113 released in the air as contained in waste gases is 60,000 tons a year. Further, it is practically difficult to get a substitute for flon-113 because of safety and price. Therefore, in many countries, efforts are directed to removal and recovery of flon-113 from waste gases containing it and reusing it.

Conventionally, recovery and reusing of flon-113 is performed by a method including adsorption with solid adsorbent such as activated carbon or the like, removal and recovery of flon-113.

However, the conventional method of adsorption and removal with a solid adsorbent is disadvantageous because heating at high temperatures or desorption with steam is required to recover absorbed flon-113, which results in increase in energy costs. Further, this treatment, flon-113 tends to decompose to give rise to acidic gases such as HCl, which corrodes the apparatus used and deteriorates the quality of flon-113 recovered. In addition, recovery of flon-113 is insufficient with the result that desorption efficiency is low and the method is economically undesirable.

SUMMARY OF THE INVENTION

Therefore, it is an object of this invention to provide a method of treating a flon-113 containing waste gas which can remove flon-113 to such an extent that the waste gas after treatment can be released in the air as it is.

Another object of this invention is to provide an apparatus adapted for performing the above-described method of treating a flon-113 containing waste gas.

As the result of extensive investigation with view to obviating the above-described defects of the conventional method and apparatus, it has now been found that some types of absorption liquor (or absorber) can efficiently absorb flon-113 in waste gas, and further that under reduced pressure, flon-113 can be recovered without being decomposed.

This invention is based on the above-described finding and provides, in one aspect, a method of treating a flon-113 containing waste gas which comprises contacting at atmospheric pressure or under pressurized conditions a flon-113 containing waste gas with at least one absorber selected from the group consisting of saturated mineral oils, alkyl diphenyl ether based oils, silicone oils, trifluorochloroethylene based oils, and perfluoropolyether based oils, having a vapor pressure of not higher than $7.6 \times 10^{-2}$ mmHg at 25° C. and a viscosity of not higher than 500 cp at 25° C., to remove flon-113 contained in the waste gas by absorbing, and depressurizing the absorber having absorbed therein flon-113 to recover flon-113.

In another aspect, this invention provides an apparatus for treating a flon-113 containing waste gas, which comprises an absorption tower in which a flon-113 containing waste gas is contacted with at least one absorber selected from the group consisting of saturated mineral oils, alkyl diphenyl ether based oils, silicone oils, trifluorochloroethylene based oils, and perfluoropolyether based oils, having a vapor pressure of not higher than $7.6 \times 10^{-2}$ mmHg at 25° C. and a viscosity of not higher than 500 cp at 25° C., a stripping tower communicated to the absorption tower, in which the absorber having absorbed therein flon-113 from the absorption tower is retained under reduced pressure to strip flon-113, a dry vacuum pump for retaining the inside of the stripping tower under reduced pressure, a condenser for cooling and condensing the discharge gas from a dry vacuum pump to recover flon-113, and a means for recycling the absorber after stripping out flon-113 to the absorption tower.

In still another aspect, this invention provides an apparatus for treating a flon-113 containing waste gas, which comprises a compressor, preferably an oil-free compressor, for compressing a flon-113 containing waste gas, an absorption tower the inside of which is retained under reduced pressure and in which the compressed flon-113 containing waste gas from the compressor is contacted with the above-described absorber, a degasing tower in which the absorber having absorbed therein flon-113 is retained under reduced pressure to degas air and a small amount of flon-113 both dissolved in the absorber, a vacuum pump for retaining the inside of the degasing tower under reduced pressure, a piping for introducing the discharge gas from the vacuum pump into an absorption site of the compressor where the flon-113 containing waste gas is absorbed, a heater for heating the degased absorber in the degasing tower, a stripping tower in which the absorber heated during its passage through the heater is retained under reduced pressure to strip or release flon-113, a dry vacuum pump for retaining the inside of the stripping tower under reduced pressure, a condenser for cooling and condensing the discharge gas from the dry vacuum pump to recover flon-113, a recycle piping for recycling the absorber after releasing flon-113 through the condenser to the absorption tower.

DETAILED DESCRIPTION OF THE INVENTION

The absorber which can be used in this invention are selected from those in which flon-113 is readily soluble and which are stable and easy to handle, and examples thereof include saturated mineral oils, alkyl diphenyl ether oils, silicone oils, and perfluoropolyether based oils.

The above-described oils contain polymerized portion and include various types of species having different molecular weights. Generally, those oils having larger molecular weights show higher vapor pressure and lower vapor pressure. In this invention, the absorbent used show a viscosity of not higher than 500 cp, preferably not higher than 100 cp, at 25 ° C., and a vapor pressure of not higher than $7.6 \times 10^{-2}$ mmHg, preferably not higher than $3.8 \times 10^{-2}$ mmHg, at 25° C. When the viscosity of the absorber exceeds 500 cp, the effect of gas-liquid contact cannot be obtained sufficiently, resulting in that the absorbability of flon-113 is decreased and the release of the once absorbed flon-113 from the absorber is also aggravated.

On the other hand, when the vapor pressure at 25° C. of the oil exceeds $7.6 \times 10^{-2}$ mmHg, the amount of the absorber conveyed by waste gas and that of the absorber accompanied by flon-113 upon recovery of flon-113 both increase. These conditions are important in view of the fact that the amount of the absorber in waste gas to be releases from the absorption step should be not more than 100 ppm by volume, preferably not more than 50 ppm by volume.

The scope of suitable oils satisfying both the above conditions is rather narrow because the viscosity and vapor pressure show conflicting tendency, i.e., the former increases and the latter decreases, with increase in the molecular weight of the oil.

Examples of suitable oil which can be used in this invention include the following oils.

Saturated mineral oil:

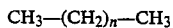

Alkyl diphenyl ether based oil

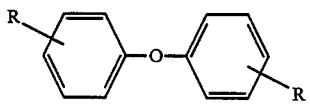

R: straight chain hydrocarbon ($C_{12}$ to $C_{18}$)

Silicone oil:

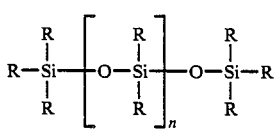

R: a methyl group, a phenyl group, or a hydrogen atom

Trifluorochloroethylene based oil:

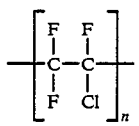

Perfluoropolyether based oil:

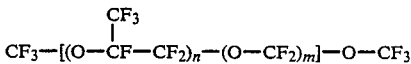　　　i

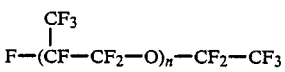　　　ii

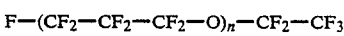　　　iii

Figure 1:
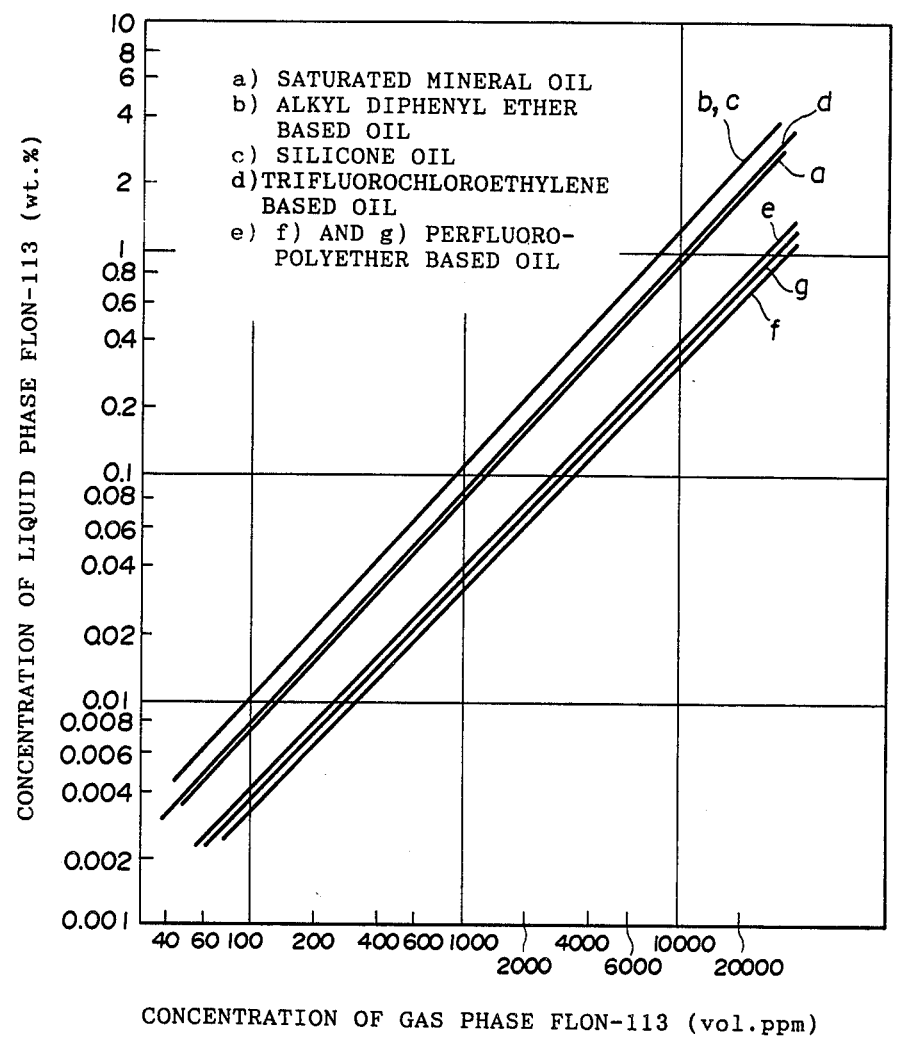
FIG. 1 is a graph showing gas-liquid equilibrium of flon-113 versus an absorber for flon-113 used in this invention.

FIG. 1 is a graph representing gas-liquid equilibrium of flon-113 in various oils satisfying the conditions required in this invention.

In said graph the vertical axis sets forth the concentration of liquid phase flon-113 in wt. % and the horizontal axis sets forth the concentration of gas phase flon-113 in volume ppm. The data depicted in the graph are identified with the letters set forth in the following Table which also identifies the oil which contains the flon-113.

TABLE

| | |
|---|---|
| (a) | SATURATED MINERAL OIL |
| (b) | ALKYL DIPHENYL ETHER BASED OIL |
| (c) | SILICONE OIL |
| (d) | TRIFLUOROCHLOROETHYLENE BASED OIL |
| (e) | PERFLUOROPOLYETHER BASED OIL |
| (f) | PERFLUOROPOLYETHER BASED OIL |
| (g) | PERFLUOROPOLYETHER BASED OIL |

Figure 2:
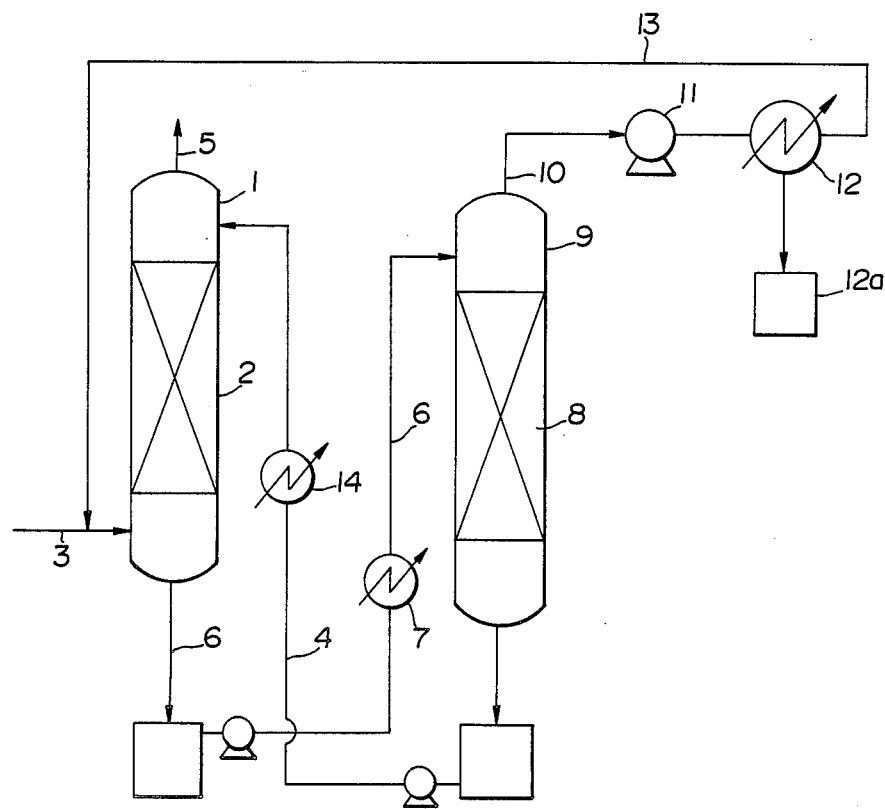
FIG. 2 is a diagram showing flow in an apparatus according to one embodiment of this invention.

FIG. 2 shows an apparatus for treating a flon-113 containing waste gas according to an embodiment of this invention. In FIG. 2, reference numeral 1 designates an absorption tower, which is packed with a packing 2 such as Raschig ring or a like. The tower 1 is provided at its lower portion with an introduction piping 3 for introducing a flon-113 containing waste gas and at its upper portion with a recycle piping 4 for introducing a recovered absorber explained hereinbelow. The waste gas to be introduced in the above-described introduction piping 3 is used as it is or after it is concentrated by a conventional concentration apparatus such as using activated carbon absorption, heated air desorption, etc.

The flon-113 containing waste gas introduced through the waste gas introduction piping 3 is contacted in countercurrent fashion with the absorber which is introduced through the recycle piping 4 to absorb and remove flon-113 contained in the waste gas, and is discharged in the air from a discharge piping 5 at the top of the tower 1. The absorber having absorbed therein flon-113 is discharged from the tower 1 through an extraction piping 6 at the bottom of the tower 1 and passed through a heater 7 to a stripping tower 9 packed with a packing 8.

At the top portion of the stripping tower 9 is connected a discharge piping 10, which in turn is connected to a dry vacuum pump 11 for retaining the inside of the stripping tower 9 under reduced pressure.

The absorber which is heated by the heater 7 and is to be introduced to the upper portion of the stripping tower 9 under reduced pressure readily releases flon-113 contained therein during its flowing down in the stripping tower 9. Flon-113 released is withdrawn from a discharge piping 10 and fed through a dry vacuum pump 11 in which no oil is used at a portion where gas is contacted to a condenser 12 where condensation of flon-113 occurs, and liquid flon-113 is recovered and stored in a receiver tower 12a. A portion of flon-113 which remain uncondensed is fed through a combination piping 13 to the absorption tower 1 to combine it with the waste gas freshly introduced into the tower 1.

The absorber after stripping of flon-113 is extracted through the recycle piping 4 at the lower part of the stripping tower 9 and circulated to the upper part of the tower 1, eventually through a cooler 14, if desired.

With the above-described construction, the apparatus of this invention does not require high temperatures for stripping flon-113 in the stripping tower 9. Flon-113 discharged from the discharge piping 10 is recovered without contamination because although use of a vacuum pump is involved it passes a dry vacuum pump 11, and therefore, flon-113 with high purity can be obtained.

In addition, although the heater 7 and the cooler 14 need not be used depending on the temperature of the open air and the degree of reduced pressure or vacuum in the stripping tower 9, it is of course desirable to use them because conditions for operation can be stabilized.

Figure 3:
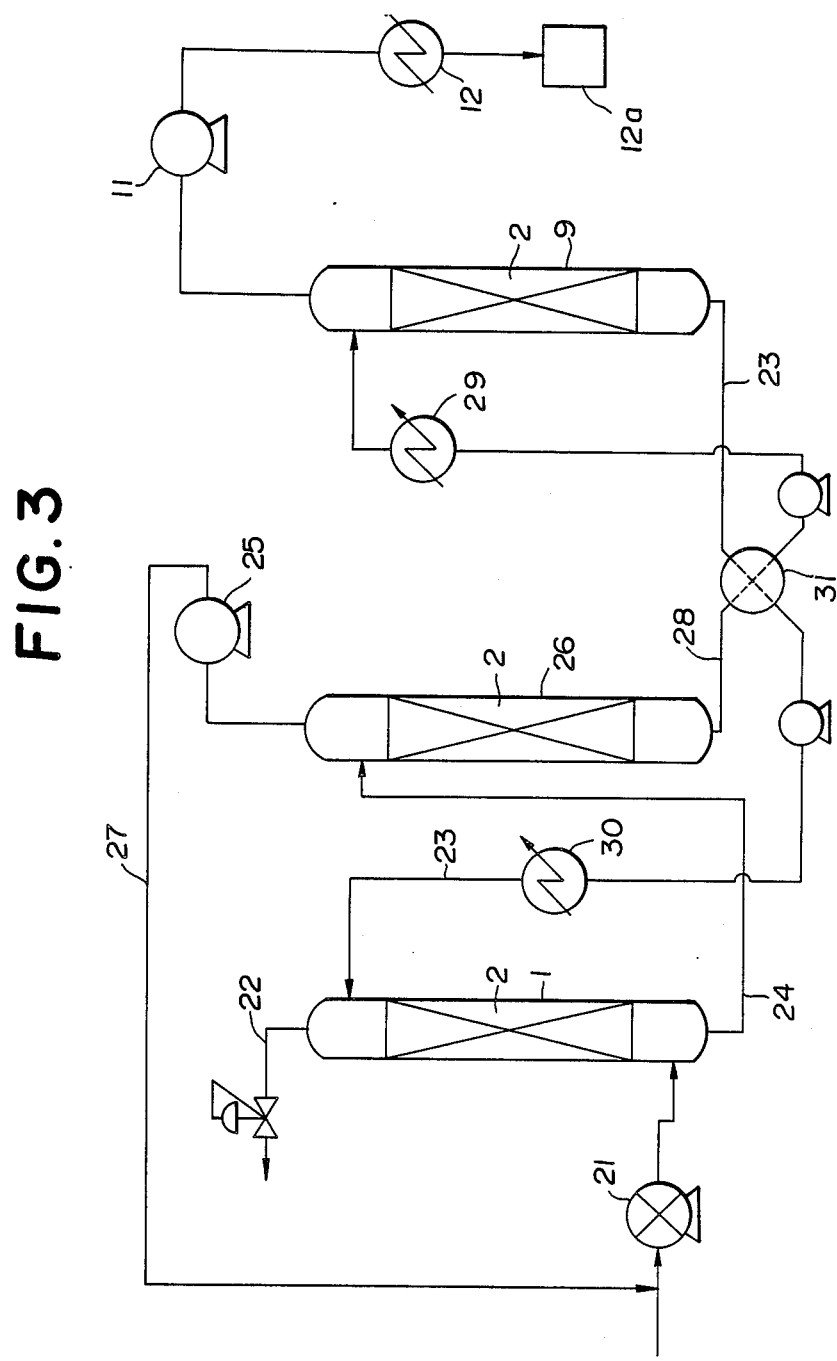
FIG. 3 is a schematical view of an apparatus for treating a flon-113 containing waste gas according to another embodiment of this invention.

FIG. 3 shows an apparatus for treating a flon-113 containing waste gas according to another embodiment of this invention in which absorption of flon-113 is conducted under pressure. The apparatus shown in FIG. 3 has the same basic construction as that of the apparatus shown in FIG. 2; like members are indicated by like reference numerals in FIG. 2 and detailed description will be omitted herein.

In FIG. 3, reference numeral 21 indicates a compressor which introduces a flon-113 containing waste gas under pressure into the absorption tower 1. On the top portion of the tower 1 is provided a discharge piping 22 having a control valve for retaining the pressure in the inside of the tower 1 at a predetermined level by releasing unabsorbed gas. On the other hand, a recycle piping 23 for feeding an absorber explained hereinbelow is connected to the upper portion of the absorption tower 1, so that the flon-113 containing waste gas and the absorber can be contacted with each other in countercurrent fashion. The absorber which has absorbed therein flon-113 is passed through an absorber extraction piping 24 connected to a lowr portion of the absporber tower 1 and is introduced into a degasing tower 26 kept under reduced pressure using a vacuum pump 25 to degas air and a small amount of flon-113 both dissolved in the absorber. The air released is fed through a combination piping 27 and combined with the flow on the absorption side of the compressor 21 by the operation of the vacuum pump 25, and is fed to the absorption tower 1 under pressure together with the flon-113 containing waste gas.

The degasd absorber extracted from an extraction piping 28 of the degasing tower 26 is heated during its passage through a heater 29 and then introduced into a stripping tower 9 which is kept under reduced pressure by means of the dry vacuum pump 11. Flon-113 released in the stripping tower 9 is condensed and recovered by means of the condenser 12 and is pooled in a receiver tower 12a.

The absorber which has released flon-113 therefrom is extracted from a lower end of the stripping tower 9 and is fed to the absorption tower 1 through the recycle piping 23 having a cooler 30.

The absorber in the recycle piping 23 is heat exchanged with the absorber in the extraction piping 28 attached to the degasing tower 26 and with a heat exchanger 31. Although it is preferred to use a dry vacuum pump as the vacuum pump 25, a general-use vacuum pump is well fit for this purpose since the concentration of flon-113 in the air obtained by degasing is low.

In this invention, the absorber used is stable and easy to handle, and has a high solubility of flon-113 but a low viscosity, resulting in that not only it can efficiently absorb flon-113 from a flon-113 containing waste gas by gas-liquid contact but also it can release flon-113 readily. Since the absorber has a low vapor pressure, only a small amount of it is accompanied by the waste gas and the amount of it accompanied by flon-113 during release and recovery of flon-113.

Therefore, the apparatus adapted to use the above-described absorber enables efficient removal and recovery of flon-113. In particular, upon reduction in the pressure of the inside of the stripping tower, use of oil-less dry vacuum pump not only enables retention of high degree of vacuum which permits release of flon-113 stably but also gives advantage of no contamination of oils into flon-113 after passage through the dry vacuum pump, thus permitting recovery of flon-113 of high quality by cooling and condensation, in contrast to use of conventional oil-rotated pump for reducing the inner pressure of the stripping tower.

Further, in the preferred embodiment of this invention which involves absorption under pressure, flon-113 is absorbed efficiently, and flon-113 is released after degasing in the degasing tower, which contributes to further improvement in the efficiency of recovery of flon-113.

This invention will be described in greater detail with reference to the following examples, which are not to be construed as being limiting this invention thereto.

EXAMPLE 1

In an apparatus as shown in FIG. 2 which is provided with an absorption tower of 230 mm in diameter packed with Good Roll (a trade name for a packing manufactured by TOKYO SPECIAL WIRE NETTINC CO., LTD.) in a length of 2 m were introduced, on one hand, a waste gas containing 2500 ppm by volume of flon-113 at a rate of 35 Nm$^3$/hr, and on the other hand, an alkyl diphenyl ether based oil ("SX Oil", manufactured by MATSUMURA OIL CO., LTD.) which had a viscosity of 50 cp at 25° C. and a vapor pressure of $1 \times 10^{-7}$ mmHg at 25° C. at a rate of 2270 kg/hr to contact them in countercurrent fashion to absorb flon-113. As the result, the waste gas discharged from the discharge piping 5 contained flon-113 in a concentration of 120 ppm by volume, the concentration of the absorber accompanied by the waste gas was not higher than 1 ppm by volume, and the concentration of flon-113 in the absorber which had absorbed flon-113 was 0.0286 percent by weight. The recovery ratio of flon-113 was 95.2 percents by weight.

EXAMPLE 2

In an apparatus as shown in FIG. 2 which is provided with an absorption tower of 300 mm in diameter packed with Good Roll (a trade name for a packing, manufactured by TOKYO SPECIAL WIRE NETTING CO., LTD.) in a length of 1 m were introduced, on one hand, a waste gas containing 5000 ppm by volume of flon-113 after concentrating it to 5.0 percents by volume using a known concentration apparatus such as one with activated carbon or heated air desorption apparatus at a rate of 240 m$^3$/hr, and on the other hand, a silicone oil ("SH200 50CS", manufactured by TORAY SILICONE CO., LTD.) which had a viscosity of 50 cp at 25° C. and a vapor pressure of $1 \times 10^{-10}$ mmHg at 25° C. at a rate of 3 m$^3$/hr to contact them in countercurrent fashion. The waste gas discharged from the discharge piping 5 contained flon-113 in a concentration of 1000 ppm by volume, and the concentration of the absorber accompanied by the waste gas was not higher than 1 ppm by volume. If desired, the waste gas could be passed to a known concentration apparatus.

The absorber which had absorbed therein flon-113 in a concentration of 1.218 percents by weight was extracted from the extraction piping 6 at a rate of 3 m$^3$/hr, and after heating it to a temperature of 120° C., it was introduced into the stripping tower 9 kept under reduced pressure of 7 mmHg using the dry vacuum pump 11 to release flon-113. In this case, flon-113 released and other gases were introduced through the vacuum pump 11 to the condenser 12. The gas had a composition of 73.3 percents by volume of flon-113, 26.7 percents by volume of inert gas, and the amount of the absorber entrained in the gas was not higher than 1 ppm by volume.

The gas was condensed by the condenser 12 which was being cooled with 0.5 ton/hr of water at 25° C. to recover flon-113 at a recovery ratio of 9.16 kg/hr. The mixed gas composed of 41.1 percents by volume of flon-113 (3.13 kg/hr) which had not been condensed by the condenser 12 and 58.5 percents by volume of inert gas was introduced through the combination piping 13 into the absorption tower 1. As the result, the concentration of flon-113 introduced into the absorption tower 1 was 6.41 percents by volume.

Also, the absorber was extracted from the lower portion of the stripping tower 9 through the recycle piping 4 at a rate of 3 m$^3$/hr. The absorber was at a temperature of 110° C. and had a concentration of flon-113 of 0.073 percent by weight.

The absorber was cooled to 25° C. by passsing it through the cooler 14 and circulated as an absorber to the absorption tower 1.

EXAMPLE 3

In an apparatus as shown in FIG. 3 which is provided with the absorption tower 1 of 300 mm in diameter packed with Good Roll (a trade name for a packing, manufactured by TOKYO WIRE NETTING CO., LTD.) in a length of 1.8 m were introduced, on one hand, a waste gas containing 5000 ppm by volume of flon-113 after pressurizing it to 3 kg/cm$^2$G using the compressor 21 at a rate of 240 Nm$^3$/hr, and on the other hand, a silicone oil ("SH200 50CS", manufactured by TORAY SILICONE CO., LTD.) which had a viscosity of 50 cp at 25° C. and a vapor pressure of $1 \times 10^{-10}$ mmHg at 25° C. at a rate of 2.2 m$^3$/hr to contact them in countercurrent fashion. The waste gas discharged from the discharge piping 22 contained flon-113 in a concentration of 140 ppm by volume, and the concentration of the absorber accompanied by the waste gas was not higher than 1 ppm by volume.

The absorber which had absorbed flon-113 in a concentration of 0.480 percent by weight was extracted from the extraction piping 24 of the absorption tower 1 at a rate of 2.2 m$^3$/hr, and introduced into the degasing tower 26 kept at a reduced pressure of 40 mmHg by means of the oil-rotated vacuum pump 25 to remove air. In this case, flon-113 was also removed simultaneously so that the degasd gas contained flon-113 in a concentration of 6.50 percents by volume, which was then fed through the combination piping 27 to the tower 1 and combined with the flon-113 containing waste gas introduced freshly into the tower 1.

As the result, the concentration of flon-113 introduced into the absorption tower 1 was 5338 percents by volume.

Further, the absorber after degasing was extracted from the extraction piping 28 of the degasing tower at a rate of 2.2 m$^3$/hr, and after heating it to a temperature of 120° C. using the heater 29, it was introduced into the stripping tower 9 kept under reduced pressure of 2 mmHg using the dry vacuum pump 11 to release flon-113. In this case, flon-113 released was introduced through the discharge piping 10 and the dry vacuum pump 11 to the condenser 12. The gas was composed of almost 100 percents by volume of flon-13, and the amount of the absorber entrained in the gas was not higher than 1 ppm by volume.

The gas was condensed by the condenser 12 which was being cooled with 0.5 ton/hr of water at 25° C. to recover flon-113 at a recovery ratio of 9.09 kg/hr.

Also, the absorber was extracted from the lower portion of the stripping tower 9 through the recycle piping 23 at a rate of 2.2 m$^3$/hr. The absorber was at a temperature of 110° C. and had a concentration of flon-113 of 0.0200 percent by weight. The absorber was cooled to 25° C. by passsing it through the cooler 30 and circulated as an absorber to the absorption tower 1.

As will be clear from the above-described examples, the method and apparatus for treating a flon-113 containing waste gas according to this invention are advantageous in various points and make a great contribution in many fields of technology. For example, they enable disposal of the flon-113 containing waste gas and release of it as it is into the open air as a waste gas free of problem of environmental pollution by appropriately selecting kind of absorber to be used and circulating the absorber without substantial replenishing thereof. Further, use of the stripping tower under reduced pressure elevates recovery ratio of flon-113, and in addition, prevents deterioration of the absorber used and of flon-113 due to its decomposition. Furthermore, use of a dry vacuum pump prevents contamination of flon-113 to be recovered, thus enabling recovery of flon-113 in high purity. pg,18

What is claimed is:

1. A method of treating a trichlorotrifluoroethane containing waste gas which comprises contacting at atmospheric pressure or under pressurized conditions a trichlorotrifluoroethane containing waste gas with at least one absorber selected from the group consisting of saturated mineral oils, alkyl diphenyl ether based oils, silicone oils, trifluorochloroethylene based oils, and perfluoropolyether based oils, having a vapor pressure of not higher than $7.6 \times 10^{-2}$ mmHg at 25° C. and a viscosity of not higher than 500 cp at 25° C., to remove trichlorotrifluoroethane contained in the waste gas by absorbing, and depressurizing the absorber having absorbed therein flon-113 to recover trichlorotrifluoroethane.

* * * * *